(12) United States Patent
Bamberger et al.

(10) Patent No.: US 9,887,545 B2
(45) Date of Patent: Feb. 6, 2018

(54) CONTROLLING AN ELECTRICAL ENERGY DISTRIBUTION NETWORK

(71) Applicants: Joachim Bamberger, München (DE); Michael Metzger, Markt Schwaben (DE); Markus Reischböck, Erlangen (DE); Andrei Szabo, Ottobrunn (DE)

(72) Inventors: Joachim Bamberger, München (DE); Michael Metzger, Markt Schwaben (DE); Markus Reischböck, Erlangen (DE); Andrei Szabo, Ottobrunn (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/004,547

(22) Filed: Jan. 22, 2016

(65) Prior Publication Data

US 2016/0218506 A1    Jul. 28, 2016

(30) Foreign Application Priority Data

Jan. 22, 2015    (DE) .................. 10 2015 201 085

(51) Int. Cl.
*H02J 3/12*    (2006.01)
*H04B 3/54*    (2006.01)
(Continued)

(52) U.S. Cl.
CPC ........ *H02J 3/12* (2013.01); *H02J 3/00* (2013.01); *H02J 3/382* (2013.01); *H02J 13/00* (2013.01);
(Continued)

(58) Field of Classification Search
CPC . G06Q 50/06; G05B 15/02; G05F 1/66; H02J 3/00; H02J 3/382; H04B 3/54
See application file for complete search history.

(56) References Cited

U.S. PATENT DOCUMENTS

| | | | |
|---|---|---|---|
| 2005/0012395 A1* | 1/2005 | Eckroad | H02J 3/16 307/44 |
| 2012/0131324 A1* | 5/2012 | Ansari | H04Q 9/00 713/100 |

(Continued)

FOREIGN PATENT DOCUMENTS

WO    WO2013189552 A1    12/2013
WO    WO2014090285 A1    6/2014

OTHER PUBLICATIONS

Bdew Bundesverband Der Energie-Und Wasserwirtschaft E. V.; "Technische Richtlinie: Erzeugungsanlagen am Mittelspannungsnetz," pp. 1-30 + 57-70 + 101-121, pp. 1-62, 2008.

(Continued)

*Primary Examiner* — Ross Varndell
(74) *Attorney, Agent, or Firm* — Lempia Summerfield Katz LLC

(57) ABSTRACT

A method for controlling an electrical energy distribution network in which electrical power is provided via network nodes connected via power lines is provided. A portion of the network nodes are controllable network nodes with respective local controllers, and at least a portion of the controllable network nodes are energy generators. The energy distribution network is coupled to an energy transmission network at a point of common coupling and provides electrical power to the energy transmission network at the point of common coupling. The electrical power originates from the controllable network nodes. A central controller communicates with the local controllers and the energy transmission network. The central controller controls the energy distribution network with the aid of the communication with the local controllers and the energy transmission network such that at the point of common coupling, (Continued)

primary control power and short-circuit power are kept available for the energy transmission network.

16 Claims, 2 Drawing Sheets

(51) Int. Cl.
*H02J 3/00* (2006.01)
*H02J 13/00* (2006.01)
*H02J 3/38* (2006.01)
*G05F 1/66* (2006.01)
*G05B 15/02* (2006.01)
*G06Q 50/06* (2012.01)

(52) U.S. Cl.
CPC .............. *H04B 3/54* (2013.01); *G05B 15/02* (2013.01); *G05F 1/66* (2013.01); *G06Q 50/06* (2013.01); *H02J 2003/003* (2013.01); *H02J 2003/007* (2013.01); *Y02E 40/72* (2013.01); *Y04S 10/123* (2013.01)

(56) References Cited

U.S. PATENT DOCUMENTS

2012/0330472 A1* 12/2012 Boot .................. G06Q 50/06
700/291
2015/0303697 A1 10/2015 Ploett

OTHER PUBLICATIONS

Fuchs E. et al: Into the New Electricity Age with Optimal Integration of Decentralized Energy Resources—the Fenix Project, WEC Montreal, Sep. 12-16, 2010, pp. 1-13.

German Office action for related German Application No. 10 2015 201 085.6, dated Jul. 7, 2015, with English Translation.

Projektbeschreibung: "NETZQ—Dezentrale Überwachung und Verbesserung der Netzqualität unter Einsatz von Leistungselektronik und neuen IKT Technologien," URL: http://www.hsa.ei.tum.de/fileadmin/tueihsa/www/Forschung/NetzQ_Flyer.pdf (abgerufen am Jun. 29, 2015), 2008.

Reischböck; M.:"Vergleich von autonomen und zentralisierten Steuerungsansätzen bezüglich einer robusten Auslegung des zukünftigen Stromnetzes," In: Workshop IT-Sicherheit und robustes Regelverhalten in Smart Grids; Berlin Nov. 27, 2014, URL: http//www.dena.de/fileadmin/user_upload/Veranstaltungen/2014/27.11._IT-sicherheit/o6_Reischboeck (abgerufen am Jun. 29, 2015,) 2014.

European Search Report for related European Application No. 15201965.9 dated Jun. 14, 2016, with English Translation.

H. Cech et al.: "Into the New Electricity Age with Optimal Integration of Decentralized Energy Resources—The FENIX Project—Content"; XP055277958; Gefunden im Internet: URL:http://www.indiaenergycongress.in/montreal/library/pdf/324.pdf; 2010.

German Office Action for related German Application No. 10 2015 201 085.6 dated Feb. 16, 2017, with English Translation.

* cited by examiner

CONTROLLING AN ELECTRICAL ENERGY DISTRIBUTION NETWORK

This application claims the benefit of DE 10 2015 201 085.6, filed on Jan. 22, 2015, which is hereby incorporated by reference in its entirety.

BACKGROUND

The present embodiments relate to a method for controlling an electrical energy distribution network, and to a corresponding energy distribution network and to a control unit.

The prior art discloses approaches for suitably controlling the provision of power by energy distribution networks with decentralized energy generators for an energy transmission network coupled thereto. E. Fuchs et al., "Into the New Electricity Age with Optimal Integration of Decentralized Energy Resources—The Fenix Project", WEC Montréal, Sep. 12-16, 2010 (Document [1]) describes the concept of a virtual power plant, in which the information from decentralized energy generators of an energy distribution network is aggregated in a central control unit. The central control unit communicates with an energy transmission network, such that the energy distribution network functions as an individual virtual power plant in relation to the energy transmission network. This power plant provides active power or reactive power for the energy transmission network, but does not describe a fully comprehensive concept for realizing essential system services for the energy transmission network.

WO 2013/189552 A1 (document [2]) describes an energy allocation method in which adaptive energy control of energy sources and loads is carried out by an allocation component and a network monitoring component. The network monitoring component checks a feasibility of the energy allocation determined by the allocation component.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for controlling an electrical energy distribution network that enables the provision of essential system services for an energy transmission network is provided.

The method according to one or more of the present embodiments serves for controlling an electrical energy distribution network in which electrical power or energy is provided via a number of network nodes connected via power lines. The term electrical power encompasses both active power and reactive power. At least a portion of the network nodes are controllable network nodes with respective local control units. At least a portion of these controllable network nodes are electrical energy generators that generate corresponding power. If appropriate, in the energy distribution network, one or a plurality of the controllable network nodes may also not be energy generators. Such network nodes may constitute, for example, controllable electrical energy loads or voltage controllers. Examples of variants of controllable network nodes are given further below.

The energy distribution network is coupled to an energy transmission network at a point of common coupling and provides electrical power to the energy transmission network at the point of common coupling. The electrical power originates from the controllable network nodes of the energy distribution network. If appropriate, a plurality of such points of common coupling may be provided. For providing the electrical power, a central control unit in the energy distribution network communicates with the local control units of the controllable network nodes and the energy transmission network (or a corresponding control component of the energy transmission network).

The method according to one or more of the present embodiments is distinguished by the fact that the central control unit controls the energy distribution network with the aid of the communication with the local control units and the energy transmission network such that at the point of common coupling, primary control power and short-circuit power are kept available for the energy transmission network. The method according to one or more of the present embodiments thus makes it possible to provide essential system services in the form of primary control power and short-circuit power. These types of power are known per se. The primary control power serves for maintaining the network frequency, and the short-circuit power enables a high current when a short circuit occurs in the energy transmission network. The primary control power may be provided based on proportional control depending on frequency fluctuations, as explained in greater detail further below.

In a further variant of the method, the central control unit also controls the energy distribution network such that at the point of common coupling, secondary control power and/or tertiary control power are/is kept available for the energy transmission network and/or harmonics and/or subharmonics of the voltage at the point of common coupling are compensated for. With this variant, therefore, even more extensive system services are provided by the energy distribution network.

In a further configuration of the method, the central control unit also controls the energy distribution network such that at the point of common coupling, as a further system service, reactive power is kept available for the energy transmission network. The reactive power, as necessary, may compensate for voltage fluctuations at the point of common coupling. This type of reactive power provision corresponds, in terms of the control principle and active principle, to the primary control power, which as active power influences the frequency. Owing to the analogy, the term "control reactive power" is used hereinafter. The control reactive power may be provided based on proportional control in a manner similar to the primary control power. The proportional control is then dependent on voltage fluctuations at the point of common coupling.

In a further configuration of the method, the central control unit also controls the energy distribution network such that the energy distribution network is operated as an island network in the event of failure of the energy transmission network. For example, the central control unit also performs a resynchronization of the energy distribution network with the energy transmission network when the energy transmission network resumes operation. In accordance with this variant, the more extensive system service of the black start capability is provided.

In a further exemplary embodiment, in the context of the communication of the central control unit, the energy transmission network setpoint values for the primary control power and short-circuit power and, if appropriate, also for the above-described secondary control power and/or tertiary control power and/or control reactive power to be kept available are communicated from the energy transmission network to the central control unit. Alternatively or additionally, in the context of the communication of the central control unit with the local control units, the primary control power and short-circuit power and, if appropriate, also the secondary control power and/or tertiary control power and/or control reactive power respectively offered by the controllable network nodes are communicated to the central control unit by the local control units. With this information exchanged, the corresponding system service may be provided for the energy transmission network in line with demand.

In one embodiment, in the central control unit, the present network loading of the energy distribution network is estimated and/or the future network loading is predicted. The central control unit takes account of the present and/or future network loading in the control of the energy distribution network such that a determined loading limit of the energy distribution network is not exceeded.

In one specific variant of this embodiment, for estimating the present network loading and/or for predicting the future network loading, actual values and/or predictions of parameters of the controllable network nodes are communicated from the respective local control units to the central control unit. Based on the present (e.g., estimated present) and/or future (e.g., predicted future) network loading, setpoint values of the parameters of the controllable network nodes are communicated from the central control unit to the respective control units. The parameters with actual and/or setpoint values that are communicated may be different depending on the configuration of the method. For example, the parameters concern voltages and/or currents and/or active and reactive powers in the respective controllable network nodes.

In a further variant of the method, for estimating the present network loading and/or for predicting the future network loading, actual values from voltage and/or current sensors arranged in the energy distribution network outside the controllable network nodes and/or weather forecasts are communicated to the central control unit. From the weather forecasts, the central control unit may determine predictions for parameters of the distribution network (e.g., the consumption or the generation of renewable energy). For example, the weather forecasts may, if appropriate, also be communicated to the local control units, which determine therefrom a prediction of the own consumption or the own generation.

In a further configuration, the point of common coupling is provided at a transformer substation. The central control unit may, but need not, be arranged in the transformer substation. For example, the energy distribution network includes a low-voltage or medium-voltage network, the voltage of which is transformed into a higher voltage of the energy transmission network via the transformer substation.

In a further variant, the controllable network nodes of the energy distribution network that are energy generators include one or a plurality of regenerative energy generators (e.g., one or a plurality of wind power installations and/or one or a plurality of photovoltaic installations and/or one or a plurality of hydroelectric power plants and/or one or a plurality of biomass power plants) with respect to local control units. Likewise, the controllable network nodes may include one or a plurality of fossil-fuel power plants and/or one or a plurality of combined heat and power plants and/or one or a plurality of combined cooling, heat, and power plants with respective local control units. All the local control units of the controllable network nodes mentioned communicate with the central control unit in the context of the control of the energy distribution network and are thus included in the control method according to one or more of the present embodiments.

In a further embodiment, the controllable network nodes of the energy distribution network include alongside energy generators one or a plurality of controllable electrical energy loads and/or one or a plurality of electrical energy stores and/or one or a plurality of microgrids with respective local control units. The local control units communicate with the central control unit in the context of the control of the energy distribution network and are thus included in the control method according to one or more of the present embodiments.

In a further configuration of the method, the controllable network nodes of the energy distribution network also include one or a plurality of voltage controllers with respective local control units that communicate with the central control unit in the context of the control of the energy distribution network and are thus likewise included in the control method according to one or more of the present embodiments. The voltage controller or voltage controllers may include one or a plurality of transformers and/or one or a plurality of capacitance banks and/or one or a plurality of series controllers.

Alongside the method described above, one or more of the present embodiments relate to an electrical energy distribution network that, for providing electrical power, includes a plurality of network nodes connected via power lines. At least a portion of the network nodes are controllable network nodes with respective local control units, and at least a portion of these controllable network nodes are energy generators. The energy distribution network is coupled to an energy transmission network at a point of common coupling and may provide electrical power to the energy transmission network at the point of common coupling. The electrical power originates from the controllable network nodes of the energy distribution network. For providing the electrical power, a central control unit in the energy distribution network may communicate with the local control units of the controllable network nodes and the energy transmission network.

The electrical energy distribution network according to one or more of the present embodiments is distinguished by the fact that the central control unit is configured such that the central control unit controls the energy distribution network with the aid of the communication with the local control units and the energy transmission network such that at the point of common coupling, primary control power and short-circuit power are kept available for the energy transmission network.

In one embodiment, the energy distribution network is configured for implementing one or more variants of the method.

One or more of the present embodiments relate to a control unit for the electrical energy distribution network just described. The control unit constitutes the above-mentioned central control unit of the energy distribution network, which is configured such that the central control unit communicates with the local control units of the controllable network nodes and the energy transmission network and, with the aid of this communication, controls the energy distribution network such that at the point of common coupling primary control power and short-circuit power are kept available for the energy transmission network. Respective features of the above-described variants of the method that are associated with the control unit may be implemented in the form of corresponding device features in the control unit.

DETAILED DESCRIPTION

Figure 1:
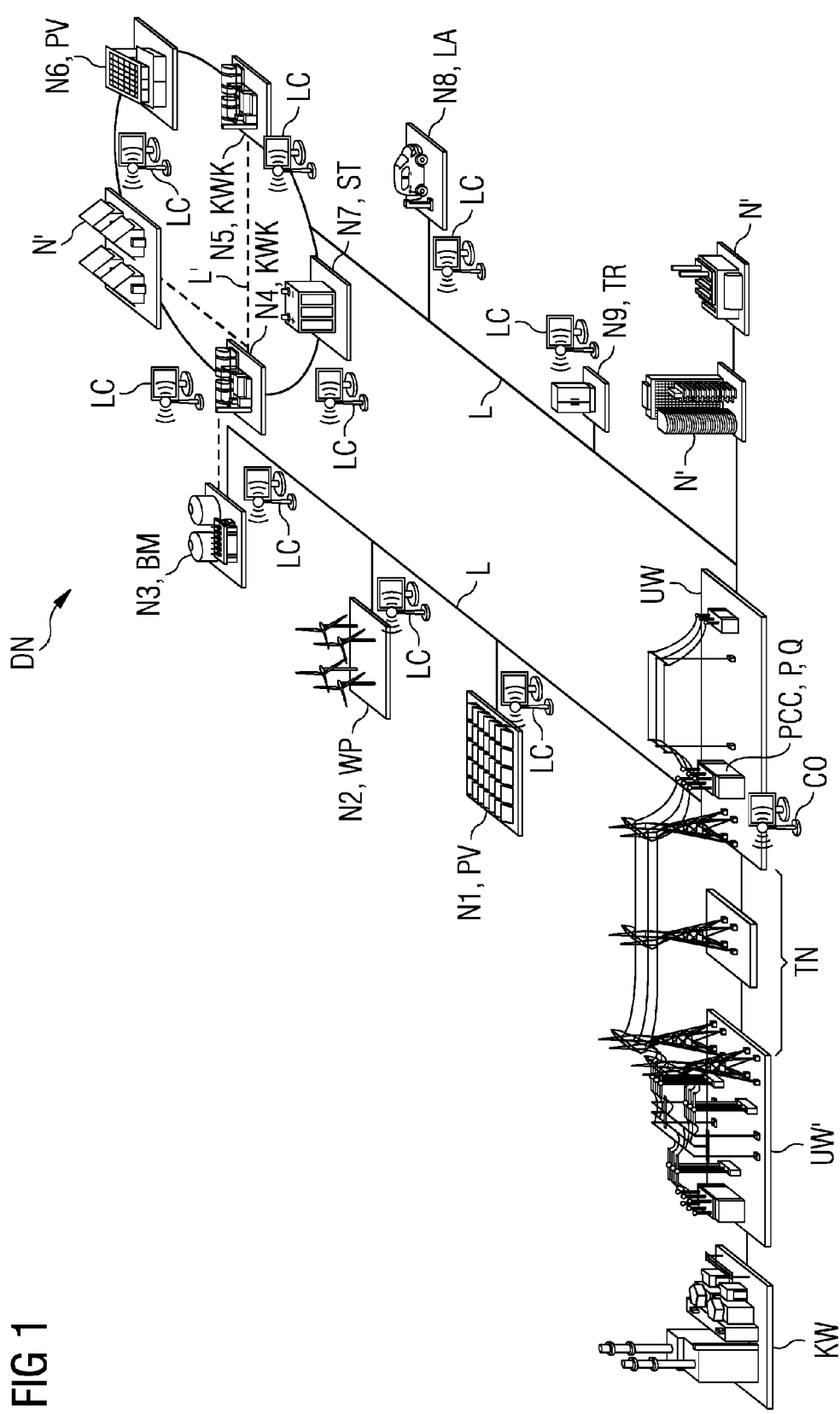
FIG. 1 shows a schematic illustration of an energy distribution network in which a variant of a control method is carried out.

FIG. 1 shows in schematic illustration the construction of one embodiment of an energy distribution network DN in which a variant of a control method is carried out. The energy distribution network DN is represented in the right-hand part of FIG. 1 and includes a transformer substation UW and a plurality of controllable network nodes N1, N2, . . . , N9 and some non-controllable network nodes N'. These network nodes are connected to one another via power lines L. The power lines are indicated in the form of solid lines in FIG. 1, and only some of the power lines are specified with the reference sign L. An exchange of heat takes place between some units in the energy distribution network, which is represented by dashed lines between the corresponding units. The heat exchange plays no direct part in the method according to one or more of the present embodiments and is therefore not explained any further.

The transformer substation UW of the energy distribution network DN is coupled to an energy transmission network TN, which is merely indicated schematically, via a point of common coupling PCC. Via the point of common coupling, active power P and reactive power Q are fed into the transmission network. The energy distribution network DN is, for example, a medium- or low-voltage network, the voltage of which is converted into a higher voltage for the transmission network TN by the transformer substation UW. FIG. 1 also shows a further conventional transformer substation UW', via which a conventional power plant KW feeds power into the transmission network TN.

For realizing the control method according to one or more of the present embodiments, a central control unit CO is provided in the transformer substation UW. The control unit has the same interfaces to an energy management system of the energy transmission network TN as conventional large power plants. The central control unit communicates with a plurality of local control units LC. The local control units are provided in the controllable network nodes N1 to N9 and not in the further non-controllable network nodes N'. The communication between the central control unit CO and the local control units LC may be carried out in a wired manner or else, if appropriate, wirelessly by radio. In this case, if appropriate, an already existing network infrastructure such as, for example, the Internet may also be used.

The individual controllable network nodes N1 to N9 are decentralized electrical energy generators and/or electrical energy stores and/or transformers and/or controllable loads. In specific detail, the network node N1 constitutes an industrial photovoltaic installation PV, the network node N2 is an industrial energy wind farm WP, and the network node N3 represents a biomass power plant BM. The network nodes N1 to N3 are thus regenerative energy generating installations. By contrast, the network nodes N4 and N5 are fossil-fuel power plants KWK based on combined heat and power. The network node N6 is a regenerative energy generating installation in the form of a photovoltaic installation PV. This installation is then installed in a private household. Instead of a photovoltaic installation, a wind power installation, for example, may also be used as a regenerative energy generating installation.

The further controllable network node N7 constitutes an electrical energy store ST (e.g., in the form of storage batteries). The energy distribution network contains the network node N8, which constitutes a controllable load LA that is an electrical vehicle charging infrastructure in FIG. 1. The network node N9 is a controllable transformer for converting voltage in the energy distribution network. In contrast to the network nodes N1 to N9, the network nodes N' contain no local control units LC. The network nodes N' may be energy consumers in the form of buildings and/or households.

The central control unit CO exchanges information with the local control units LC and with the transmission network TN in order, on the basis thereof, to provide power in the form of active power P and reactive power Q to the transmission network via the point of common coupling PCC. In this case, the provision of system services in the form of control power and short-circuit power is also made possible, as will be explained with reference to FIG. 2. The energy distribution network DN in this sense constitutes a topological power plant having network nodes in a clearly defined network area and having a unique point of common coupling to the superposed energy transmission network.

Figure 2:
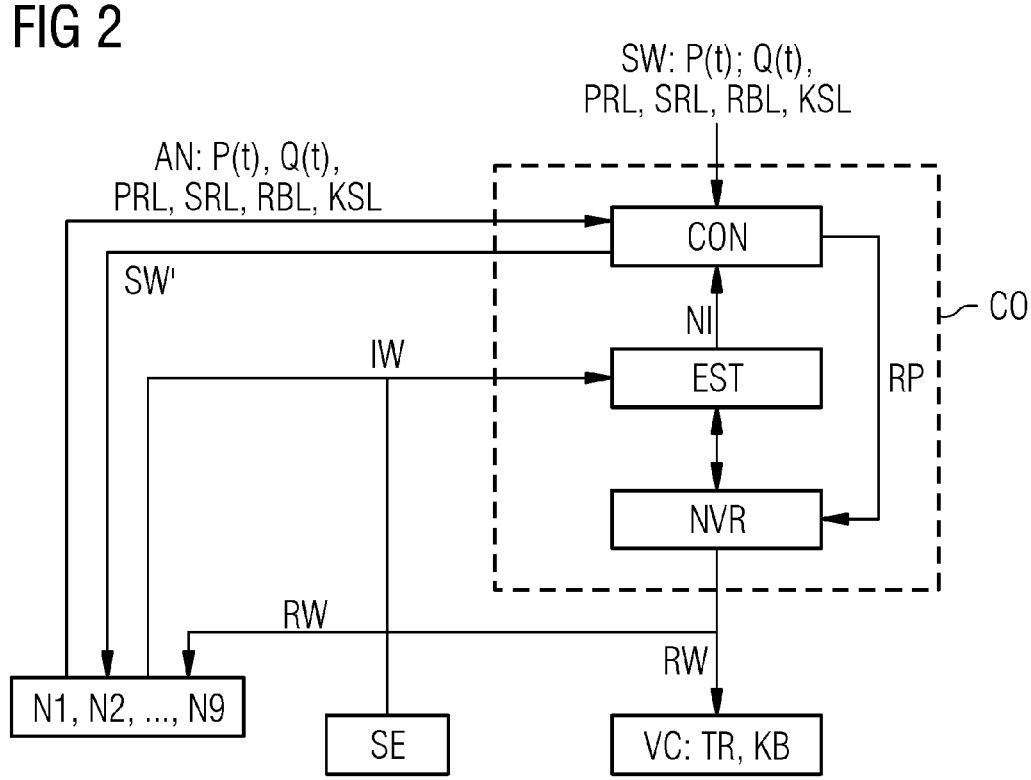
FIG. 2 shows a diagram representing the sequence of a variant of the method in the energy distribution network from FIG. 1.

The control shown in FIG. 2 is based on the principle of adaptive energy control in the document WO 2013/189552 A1. In addition, the control also makes it possible to provide the system services mentioned above. In accordance with FIG. 2, a control component CON in the central control unit CO, indicated by the dashed rectangle, receives setpoint values SW from the energy transmission network TN. The setpoint values SW include, inter alia, the temporal profile P(t) and Q(t) of the active power and reactive power, respectively, to be provided by the energy distribution network DN. In other words, schedules for the active power and reactive power generation of the energy distribution network DN are communicated to the control component CON.

Alongside the schedules, setpoint values for the primary control power PRL, the secondary control power SRL, the control reactive power RBL and the short-circuit power KSL are additionally predefined. The variables of primary control power, secondary control power, and short-circuit power are known to the person skilled in the art and are therefore not explained in any further detail. The primary control power may be controlled by a proportional controller that provides active power based on fluctuations of the nominal frequency of the network taking account of a proportionality factor. Specifically, the primary control power may be set by a proportional controller as follows:

$$PRL = P_0 + k_f \Delta f \quad (1)$$

In this case, $P_0$ denotes a predefined active power value, $\Delta f$ is the deviation from the nominal frequency, and $k_f$ is the proportionality factor mentioned.

The primary control power is provided within a few seconds. In contrast thereto, a longer period of time is defined for providing the secondary control power. The short-circuit power enables the energy distribution network to provide enough current in the case of a short circuit in the energy transmission network, such that the short circuit may be detected via a correspondingly high short-circuit current in the transmission network.

The control reactive power mentioned may be controlled by a proportional controller analogously to the primary control power, but the proportional control is now dependent on the voltage at the point of common coupling PCC. Specifically, the proportional control in such a controller reads as follows:

$$RBL = Q_0 + k_U \cdot \Delta U \qquad (2)$$

$Q_0$ is a predefined reactive power value, and $\Delta U$ denotes the deviation of the voltage at the point of common coupling from a nominal voltage value. $k_U$ is a proportionality factor of this control.

The component CON performs the actual control of the energy distribution network and, for this purpose, receives the abovementioned setpoint values SW from the energy transmission network TN. The component CON receives from the local control units LC of the respective network nodes N1 to N9 offers AN for active power P(t), reactive power Q(t), and primary control power PRL, secondary control power SRL, control reactive power BRL, and short-circuit power KSL available in the individual network nodes. These offers may be procured by the controller CON in exchange for a monetary payment. The control component CON processes the setpoint values SW and the offers AN. In this case, the control component CON also takes account of the results of a network loading estimator EST that is part of the central control unit CO.

The network loading estimator EST estimates, using known methods, the loading of the energy distribution network using actual values IW of corresponding parameters of the network nodes N1 to N9 and/or actual values IW (e.g., measured values) of corresponding voltage and/or current sensors SE outside the network nodes. The parameters of the network nodes may concern arbitrary power engineering variables of the individual network nodes and relate, for example, to the active powers, reactive powers, voltages and currents that occur in the individual network nodes. These actual values IW are processed by the network loading estimator EST in order thereby to determine a network load indication NI, which is passed to the control component CON. If appropriate, there is also the possibility of the network loading estimator EST predicting the network loading for the future by suitable models by methods known per se, and transferring the corresponding predicted value alongside the network load indicator NI to the control component CON.

The control component CON takes account of the network load indicator in the control in such a way as to comply with a predetermined network loading limit that, if exceeded, entails the consequence that the energy distribution network may be damaged or a failure of the network can occur. The principle of the control carried out by the component CON taking account of the results of the network loading estimator EST may be gathered from document [2] cited above. With recourse to the method in the document, the provision of primary control power, secondary control power, control reactive power, and short-circuit power is then also taken into consideration. An implementation of these additional power values is viable without any problems for the person skilled in the art in view of the disclosure of document [2].

As a result of the control carried out by the component CON, the power values in accordance with the setpoint values SW are provided for the transmission network TN. In order to achieve this, setpoint values SW' of the abovementioned parameters with actual values that were transmitted to the network loading estimator EST are passed to the individual local control units LC. The setting of the parameters to the corresponding setpoint values SW' simultaneously provides that a network overload does not occur.

Using the control component CON in combination with the network loading estimator EST, imminent bottlenecks within the energy distribution network may be identified or predicted and correspondingly compensated for and avoided. The setpoint values SW from the transmission network TN are suitably divided into setpoint values SW' for the local network nodes, which are communicated to the respective local control units. It is thereby possible to coordinate the incorporated energy generators, energy stores, controllable loads and, if appropriate, microgrids in the voltage range of the energy distribution network such that the energy distribution network as a whole in the superposed energy transmission network participates in the provision of primary control power, secondary control power, control reactive power and short-circuit power, and the system services mentioned above may be reliably provided by the simultaneous avoidance of bottlenecks within the energy distribution network. In addition, the traditional applications, such as marketing of electricity products on the electricity market, are also covered via the processing of corresponding schedules.

The network voltage controller NVR is optionally provided in the control in FIG. 2. The controller exchanges information with the network loading estimator EST in order to suitably define the voltage in the energy distribution network. The network voltage controller NVR receives from the control component CON control parameters RP such as, for example, setpoint reactive power values, and the voltage controller NVR calculates therefrom control values or setpoint values RW for the voltage control. The control values or the setpoint values RW are then passed to the local controllers LC of the network nodes N1 to N9 and/or to the voltage controllers VC, once again shown separately. The voltage controllers may constitute, inter alia, transformers TR and/or, if appropriate, capacitance banks KB.

The above-described embodiments have a series of advantages. For example, the control of an energy distribution network is provided such that the energy distribution network constitutes toward the transmission network a topological power plant that enables for the first time the full system integration of decentralized installations including the participation in all relevant system services (e.g., provision of primary control power, secondary control power, and short-circuit power).

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for controlling an electrical energy distribution network in which electrical power is provided from a plurality of network nodes connected via power lines, wherein the plurality of network nodes are controllable network nodes with respective local control units, and the plurality of the controllable network nodes are energy generators, wherein the electrical energy distribution network is coupled to an energy transmission network at a point of common coupling and provides electrical power to the energy transmission network at the point of common coupling, the electrical power originating from the controllable network nodes of the energy distribution network, the method comprising:

communicating, by a central control unit in the energy distribution network, with the local control units of the controllable network nodes and the energy transmission network for providing electrical power from the energy distribution network to the energy transmission network; and controlling, by the central control unit, the controllable network nodes in the energy distribution network with the aid of the communication with the local control units and the energy transmission network such that, at the point of common coupling, primary control power and short-circuit power are kept available for the energy transmission network.

2. The method of claim 1, further comprising controlling, by the central control unit, the energy distribution network such that at the point of common coupling secondary control power, tertiary control power, or secondary control power and tertiary control power are kept available for the energy transmission network, harmonics, subharmonics, or harmonics and subharmonics of the voltage at the point of common coupling are compensated for, or a combination thereof.

3. The method of claim 1, further comprising controlling, by the central control unit, the energy distribution network such that at the point of common coupling, control reactive power is kept available for the energy transmission network, and wherein the control reactive power is provided for compensating for voltage fluctuations at the point of common coupling.

4. The method of claim 1, further comprising controlling, by the central control unit, the energy distribution network such that the energy distribution network is operated as an island network in the event of failure of the energy transmission network.

5. The method of claim 1, wherein communicating, by the central control unit, with the energy transmission network comprises communicating setpoint values for the primary control power and short-circuit power to be kept available from the energy transmission network to the central control unit, communicating, by the central control unit, with the local control units comprises communicating the primary control power and short-circuit power respectively offered by the controllable network nodes to the central control unit by the local control units.

6. The method of claim 1, further comprising estimating, in the central control unit, present network loading of the energy distribution network, predicting future network loading, or a combination thereof, wherein the central control unit takes account of the present network loading, the future network loading, or the present network loading and the future network loading in the control of the energy distribution network such that a predetermined loading limit of the energy distribution network is not exceeded.

7. The method of claim 6, wherein estimating the present network loading, predicting future network loading actual values, or a combination thereof comprises, or the method further comprises communicating predictions of parameters of the controllable network nodes from the respective local control units to the central control unit, and communicating, based on the present network loading, the future network loading, or the present network loading and the future network loading, setpoint values of the parameters of the controllable network nodes from the central control unit to the respective local control units.

8. The method of claim 7, wherein estimating the present network loading, predicting the future network loading actual values, or a combination thereof comprises estimating the present network loading, predicting the future network loading actual values, or a combination thereof from voltage sensors, current sensors, or voltage sensors and current sensors arranged in the energy distribution network outside the controllable network nodes, and wherein the method further comprises communicating weather forecasts to the central control unit, at least a portion of the local control units, or a combination thereof.

9. The method of claim 1, wherein the point of common coupling is provided at a transformer substation.

10. The method of claim 1, wherein the controllable network nodes of the energy distribution network that are energy generators comprise one or more regenerative energy generators, the one or more regenerative energy generators comprising respective local control units that communicate with the central control unit in the context of the control of the energy distribution network.

11. The method of claim 10, wherein the one or more regenerative energy generators comprise one or more wind power installations, one or more photovoltaic installations, one or more hydroelectric power plants, one or more biomass power plants, one or more fossil-fuel power plants, one or more combined heat and power plants, one or more combined cooling, heat and power plants, or any combination thereof.

12. The method of claim 1, wherein the controllable network nodes of the energy distribution network comprise one or more controllable energy loads, one or more energy stores, one or more microgrids, or any combination thereof with respective local control units that communicate with the central control unit in the context of the control of the energy distribution network.

13. The method of claim 1, wherein the controllable network nodes of the energy distribution network comprise one or more voltage controllers with respective local control units that communicate with the central control unit in the context of the control of the energy distribution network, wherein the voltage controller or voltage controllers comprise one or more transformers, one or more capacitance banks, one or more series controllers, or any combination thereof.

14. An electrical energy distribution network for providing electrical power, the electrical energy distribution network comprising:

a plurality of network nodes connected via power lines, wherein the plurality of network nodes are controllable network nodes with respective local control units, and the controllable network nodes are energy generators, wherein the electrical energy distribution network is coupled to an energy transmission network at a point of common coupling and is operable to provide electrical power to the energy transmission network at the point of common coupling, the electrical power originating from the controllable network nodes of the energy distribution network;

a central control unit for communicating for providing the electrical power, the central control unit operable to communicate with the local control units of the controllable network nodes and the energy transmission network, wherein the central control unit is configured to control the energy distribution network with the aid of the communication with the local control units and the energy transmission network such that, at the point of common coupling, primary control power and short-circuit power are kept available for the energy transmission network, the primary control power for maintaining the network frequency and the short-circuit power for providing a high current when a short circuit occurs in the energy transmission network.

15. The energy distribution network of claim 14, wherein the central control unit is further configured to control the energy distribution network such that the energy distribution network is operated as an island network in the event of failure of the energy transmission network.

16. A control unit for an electrical energy distribution network, the electrical energy distribution network comprising a plurality of network nodes connected via power lines, wherein the plurality of network nodes are controllable network nodes with respective local control units, and the controllable network nodes are energy generators, wherein the electrical energy distribution network is coupled to an energy transmission network at a point of common coupling and is operable to provide electrical power to the energy transmission network at the point of common coupling, the electrical power originating from the controllable network nodes of the energy distribution network, the electrical energy distribution network further comprising a central control unit for controlling the electrical power, the central control unit operable to communicate with the local control units of the controllable network nodes and the energy transmission network, wherein the central control unit is configured to control the energy distribution network with the aid of the communication with the local control units and the energy transmission network such that at the point of common coupling, primary control power and short-circuit power are kept available for the energy transmission network, the control unit comprising:

a processor that is the central control unit of the energy distribution network, wherein the processor is configured to communicate with the local control units of the controllable network nodes and the energy transmission network, and wherein, with the aid of this communication, the processor is further configured to control the energy distribution network such that at the point of common coupling, primary control power and short-circuit power are kept available for the energy transmission network, the primary control power for maintaining the network frequency and the short-circuit power for providing a high current when a short circuit occurs in the energy transmission network.

* * * * *